US012683774B2

(12) United States Patent
Amer et al.

(10) Patent No.: US 12,683,774 B2
(45) Date of Patent: Jul. 14, 2026

(54) SYSTEMS AND METHODS FOR PRACTICAL NEAR-TERM POSITION VERIFICATION FROM CERTIFIED RANDOMNESS

(71) Applicant: JPMORGAN CHASE BANK, N.A., New York, NY (US)

(72) Inventors: Omar Amer, New York, NY (US); Kaushik Chakraborty, Singapore (SG); Fatih Kaleoglu, Santa Barbara, CA (US); Charles Lim, Singapore (SG); Marco Pistoia, Amawalk, NY (US); Minzhao Liu, Chicago, IL (US); David Cui, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 136 days.

(21) Appl. No.: 18/903,860

(22) Filed: Oct. 1, 2024

(65) Prior Publication Data

US 2026/0095313 A1 Apr. 2, 2026

(51) Int. Cl.
*H04L 9/08* (2006.01)
*H04L 9/32* (2006.01)

(52) U.S. Cl.
CPC .......... *H04L 9/0852* (2013.01); *H04L 9/0869* (2013.01); *H04L 9/3242* (2013.01)

(58) Field of Classification Search
None
See application file for complete search history.

(56) References Cited

U.S. PATENT DOCUMENTS

2018/0367994 A1* 12/2018 Danev .................... H04B 1/707
2020/0228988 A1* 7/2020 Yang .................. H04L 63/1466
2022/0131698 A1* 4/2022 Badrinarayanan .... H04L 9/3255

FOREIGN PATENT DOCUMENTS

EP 1283616 A2 * 2/2003 ........... H04L 9/3271
WO WO-2015118179 A1 * 8/2015 ........... H04L 9/3271

OTHER PUBLICATIONS

Yamakawa, Takashi; et al., "Verifiable Quantum Advantage without Structure", NTT Social Informatics Laboratories, Jun. 20, 2022.

Aaronson, Scott; et al., Certified Randomness from Quantum Supremacy:, University of Texas Austin, Mar. 2, 2023.

Brakerski, Zvika; et al., "A Cryptographic Test of Quantumness and Certifiable Randomness from a Single Quantum Device", Weizmann Institute of Science, Israel, May 4, 2021.

* cited by examiner

*Primary Examiner* — Benjamin E Lanier

(74) *Attorney, Agent, or Firm* — GREENBERG TRAURIG LLP

(57) ABSTRACT

A first verifier and second verifier may share a secret string, a first and second random input; may generate a challenge according to a certified randomness protocol and may encrypt the challenge using a keyed cryptographic hash function. The first verifier may send the encrypted challenge, the first random input, and the random hash key to a prover. The second verifier may send second random input to the prover. The prover may decrypt the encrypted challenge and may execute a random quantum computation based on the certified randomness protocol and the challenge and may send a result of the random quantum computation to both the first verifier and the second verifier. The first and second verifiers may determine the results were received within a time threshold, may compare the results to ensure that they match, and may determine the result passes the certified randomness protocol.

20 Claims, 4 Drawing Sheets

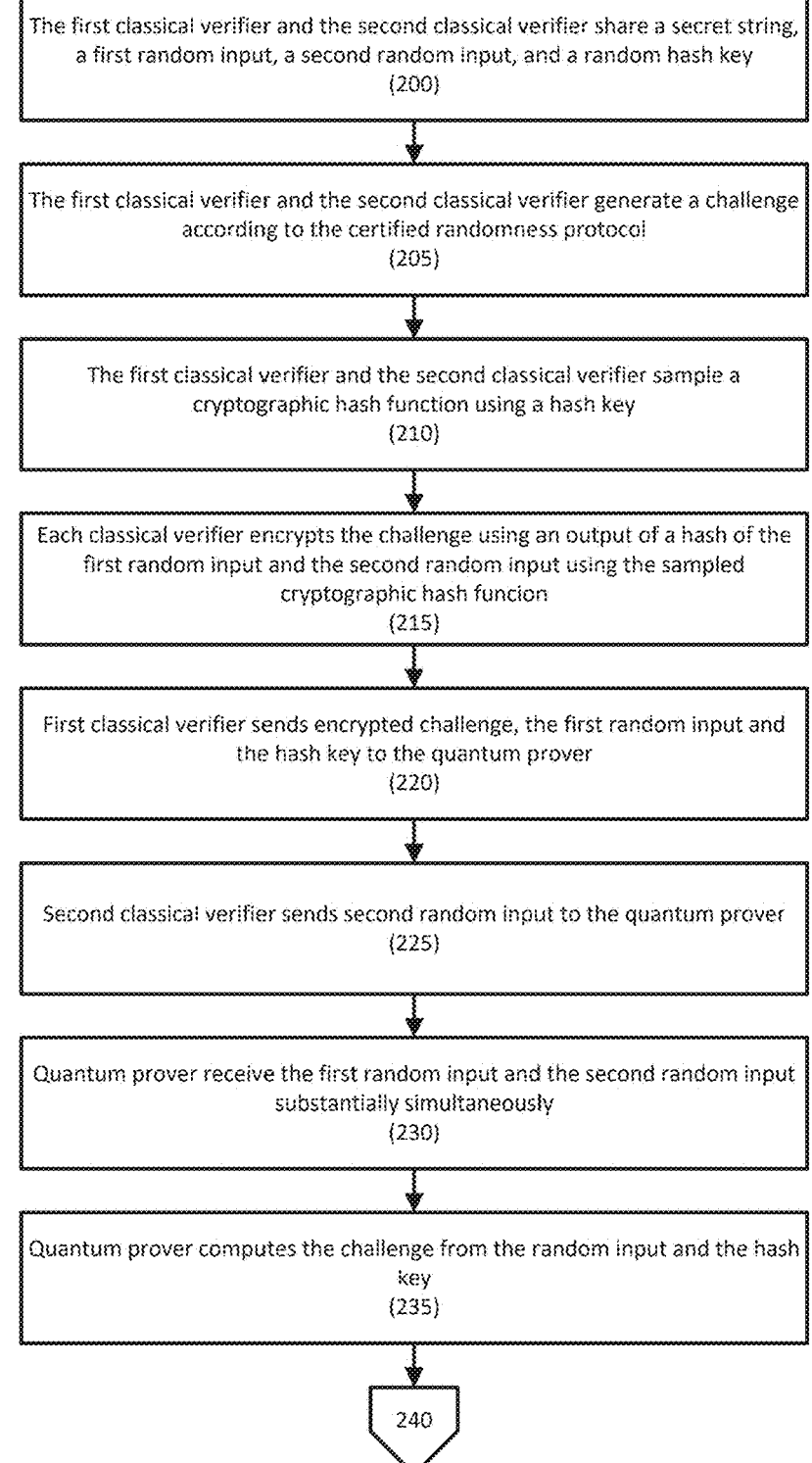

The first classical verifier and the second classical verifier share a secret string, a first random input, a second random input, and a random hash key
(200)

The first classical verifier and the second classical verifier generate a challenge according to the certified randomness protocol
(205)

The first classical verifier and the second classical verifier sample a cryptographic hash function using a hash key
(210)

Each classical verifier encrypts the challenge using an output of a hash of the first random input and the second random input using the sampled cryptographic hash funcion
(215)

First classical verifier sends encrypted challenge, the first random input and the hash key to the quantum prover
(220)

Second classical verifier sends second random input to the quantum prover
(225)

Quantum prover receive the first random input and the second random input substantially simultaneously
(230)

Quantum prover computes the challenge from the random input and the hash key
(235)

SYSTEMS AND METHODS FOR PRACTICAL NEAR-TERM POSITION VERIFICATION FROM CERTIFIED RANDOMNESS

BACKGROUND OF THE INVENTION

1. Field of the Invention

Embodiments relate to systems and methods for practical near-term position verification from certified randomness.

2. Description of the Related Art

Position verification is often used to establish the identity of devices attempting to each other. For example, a prover may be asked to perform a specific measurement, such as a quantum measurement, on inputs provided by verifiers, and return that to the verifiers. This, however, requires quantum communication, which limits its availability.

SUMMARY OF THE INVENTION

Systems and methods for practical near-term position verification from certified randomness are disclosed. In one embodiment, a method may include: (1) sharing, by a first classical verifier and a second classical verifier, a long secret string comprising a secret string, a first random input, a second random input, and a random hash key that identifies one of a plurality of keyed cryptographic hash functions; (2) generating, by the first classical verifier and the second classical verifier, a challenge according to a certified randomness protocol using the secret string; (3) sampling, by the first classical verifier and the second classical verifier, a keyed cryptographic hash function from the plurality of keyed cryptographic hash functions using the random hash key; (4) encrypting, by each of the first classical verifier and the second classical verifier, the challenge using an output of the keyed cryptographic hash function on a combination of the first random input and the second random input; (5) sending, by the first classical verifier, the encrypted challenge, the first random input, and the random hash key to a quantum prover; (6) sending, by the second classical verifier, the second random input to the quantum prover; (7) receiving, by the quantum prover, the encrypted challenge, the first random input and the second random input; (8) decrypting, by the quantum prover, the encrypted challenge using the random hash key, the first random input, and the second random input; (9) executing, by the quantum prover, a random quantum computation based on the certified randomness protocol and the challenge; (10) sending, by the quantum prover, a result of the random quantum computation to both the first classical verifier and the second classical verifier; (11) determining, by the first classical verifier and the second classical verifier, that the result of the random quantum computation was received within a time threshold; (12) comparing, by the first classical verifier and the second classical verifier, the result received by the first classical verifier and the result received by the second classical verifier to ensure that they match; and (13) determining, by the first classical verifier and the second classical verifier that the result passes the certified randomness protocol using the secret string.

In one embodiment, the challenge may be generated using a randomness in the secret string, wherein the randomness may include bits selected from the secret string.

In one embodiment, the challenge may include a description of a quantum circuit.

In one embodiment, the keyed cryptographic hash function may include a salted hash function or a hash-based message authentication code (HMAC).

In one embodiment, the time threshold may be based on a physical distance between at least one of the first classical verifier and the second classical verifier, and the quantum prover.

In one embodiment, the certified randomness protocol may include a process for generating the challenge, a process for proving certified randomness using the challenge to generate the result, and a process for verifying that the result passes the certified randomness protocol.

In one embodiment, the method may also include generating, by the first classical verifier and the second classical verifier, a second challenge according to the certified randomness protocol using the secret string; encrypting, by each of the first classical verifier and the second classical verifier, the second challenge using the output of the keyed cryptographic hash function on a combination of the first random input and the second random input; sending, by the first classical verifier, the second encrypted challenge to the quantum prover, wherein the second encrypted challenge is sent before the result is received; sending, by the second classical verifier, the second random input to the quantum prover; receiving, by the quantum prover, the second encrypted challenge and the second random input; computing, by the quantum prover, the second challenge using the random hash key, the first random input, and the second random input to decrypt the encrypted challenge; running, by the quantum prover, a certified randomness prover on the second challenge to obtain a second result; sending, by the quantum prover, the second result to both the first classical verifier and the second classical verifier; determining, by the first classical verifier and the second classical verifier, that the second result was received within the time threshold; comparing, by the first classical verifier and the second classical verifier, the second result received by the first classical verifier and the second result received by the second classical verifier to ensure that they match; and determining, by the first classical verifier and the second classical verifier that the second result passes the certified randomness protocol.

In one embodiment, the first classical verifier and the second classical verifier may include classical electronic devices, and the quantum prover may include a classical electronic device with access to a quantum computer.

In one embodiment, the method may also include agreeing, by the first classical verifier and the second classical verifier, to a selection of the certified randomness protocol; and publishing, by the first classical verifier or the second classical verifier, the selected certified randomness protocol to the quantum prover.

In one embodiment, wherein the secret string may include random bits and may be known to only the first classical verifier and the second classical verifier.

According to another embodiment, a system may include: a first classical verifier executing a first classical verifier computer program; a second classical verifier executing a second classical verifier computer program; and a quantum prover executing a quantum prover computer program, wherein the quantum prover has access to a quantum computer. The first classical verifier computer program and the second classical verifier computer program share a long secret string comprising a secret string, a first random input, a second random input, and a random hash key that identifies one of a plurality of keyed cryptographic hash functions. The first classical verifier computer program and the second classical verifier computer program generate a challenge according to a certified randomness protocol using the secret string. The first classical verifier computer program and the second classical verifier computer program sample a keyed cryptographic hash function from the plurality of keyed cryptographic hash functions using the random hash key. The first classical verifier computer program and the second classical verifier computer program each encrypt the challenge using an output of the keyed cryptographic hash function on a combination of the first random input and the second random input. The first classical verifier computer program sends the encrypted challenge, the first random input, and the random hash key to the quantum prover. The second classical verifier computer program sends the second random input to the quantum prover computer program. The quantum prover computer program receives the encrypted challenge, the first random input and the second random input. The quantum prover computer program decrypts the encrypted challenge using the random hash key, the first random input, and the second random input. The quantum prover computer program executes a random quantum computation based on the certified randomness protocol and the challenge using the quantum computer. The quantum prover computer program sends, a result of the random quantum computation to both the first classical verifier computer program and the second classical verifier computer program. The first classical verifier computer program and the second classical verifier computer program determine that the result of the random quantum computation was received within a time threshold. The first classical verifier computer program and the second classical verifier computer program compare the result received by the first classical verifier and the result received by the second classical verifier to ensure that they match. The first classical verifier computer program and the second classical verifier computer program determine that the result passes the certified randomness protocol using the secret string.

In one embodiment, the challenge may be generated using a randomness in the secret string, wherein the randomness may include bits selected from the secret string.

In one embodiment, the challenge may include a description of a quantum circuit.

In one embodiment, the keyed cryptographic hash function may include a salted hash function or a hash-based message authentication code (HMAC).

In one embodiment, the time threshold may be based on a physical distance between at least one of the first classical verifier and the second classical verifier, and the quantum prover.

In one embodiment, the certified randomness protocol may include a process for generating the challenge, a process for proving certified randomness using the challenge to generate the result, and a process for verifying that the result passes the certified randomness protocol.

In one embodiment, the first classical verifier computer program and the second classical verifier computer program generate a second challenge according to the certified randomness protocol using the secret string. The first classical verifier computer program and the second classical verifier computer program encrypt the second challenge using the output of the keyed cryptographic hash function on a combination of the first random input and the second random input. The first classical verifier computer program sends the second encrypted challenge to the quantum prover, wherein the second encrypted challenge is sent before the result is received. The second classical verifier computer program sends the second random input to the quantum prover. The quantum prover computer program receives the second encrypted challenge and the second random input. The quantum prover computes the second challenge using the random hash key, the first random input, and the second random input to decrypt the encrypted challenge. The quantum prover runs the certified randomness prover on the second challenge to obtain a second result. The quantum prover computer program sends the second result to both the first classical verifier computer program and the second classical verifier computer program. The first classical verifier computer program and the second classical verifier computer program determine that the second result was received within the time threshold. The first classical verifier computer program and the second classical verifier computer program compare the second result received by the first classical verifier and the second result received by the second classical verifier to ensure that they match. The first classical verifier computer program and the second classical verifier computer program determine that the second result passes the certified randomness protocol.

In one embodiment, the first classical verifier and the second classical verifier may include classical electronic devices, and the quantum prover may include a classical electronic device with access to a quantum computer.

In one embodiment, the first classical verifier and the second classical verifier agree to a selection of the certified randomness protocol; and the first classical verifier or the second classical verifier publish the selected certified randomness protocol to the quantum prover.

In one embodiment, the secret string may include random bits and may be known to only the first classical verifier and the second classical verifier.

BRIEF DESCRIPTION OF THE DRAWINGS

For a more complete understanding of the present invention, the objects and advantages thereof, reference is now made to the following descriptions taken in connection with the accompanying drawings in which:

FIGS. 2A and 2B illustrate a method for practical near-term position verification from certified randomness according to an embodiment;

DETAILED DESCRIPTION OF PREFERRED EMBODIMENTS

Embodiments relate to systems and methods for practical near-term position verification from certified randomness.

Embodiments may use geographical location to remotely establish the identity of a prover. For example, there may be at least two classical verifiers that each have a known location, and a quantum prover that claims to be located at location X between the two verifiers. The classical verifiers may share a long secret string which they may use to determine parts of their messages to the prover. The secret may be chosen by one of the classical verifiers and shared with the other classical verifier(s), or it may be jointly chosen.

The classical verifiers may engage in an interactive protocol with the quantum prover, and each may provide messages based on different parts of the secret. The quantum prover may reconstruct a challenge based on the shares that it receives and may respond with an answer to each classical verifier.

Each of the classical verifiers receives a result from the quantum prover and may accept or reject the quantum prover.

Embodiments may use secret sharing to prevent classical attacks on the protocol.

Embodiments may use hashing to prevent distributed attacks. For example, a random computation may be distributed using the shares.

Embodiments may use certified randomness to prevent deterministic sampling attacks.

Embodiments allow for the secure sharing of a long secret string between the first and second classical verifiers, which includes a secret string, a first random input, a second random input, and a random hash key. This arrangement ensures that both verifiers have synchronized and consistent data to perform subsequent steps, enhancing the reliability and security of the position verification process.

By sampling a challenge according to a certified randomness protocol using the shared secret string, embodiments leverage certified randomness to generate unpredictable and verifiable challenges. This prevents deterministic sampling attacks and ensures that the challenge is genuinely random, which is crucial for the integrity of the position verification.

The use of a cryptographic hash function from a pre-agreed family of keyed cryptographic hash functions, sampled using the random hash key, ensures that the challenge encryption is robust against cryptographic attacks, making it difficult for an adversary to predict the challenge nor learn partial information about it.

Encrypting the challenge using the output of the cryptographic hash function on a combination of the first and second random inputs ensures adversaries that do not learn both inputs cannot predict the challenge and therefore cannot answer appropriately, protecting against adversaries that are not in the prescribed position and to learn the inputs at different times.

Figure 1:
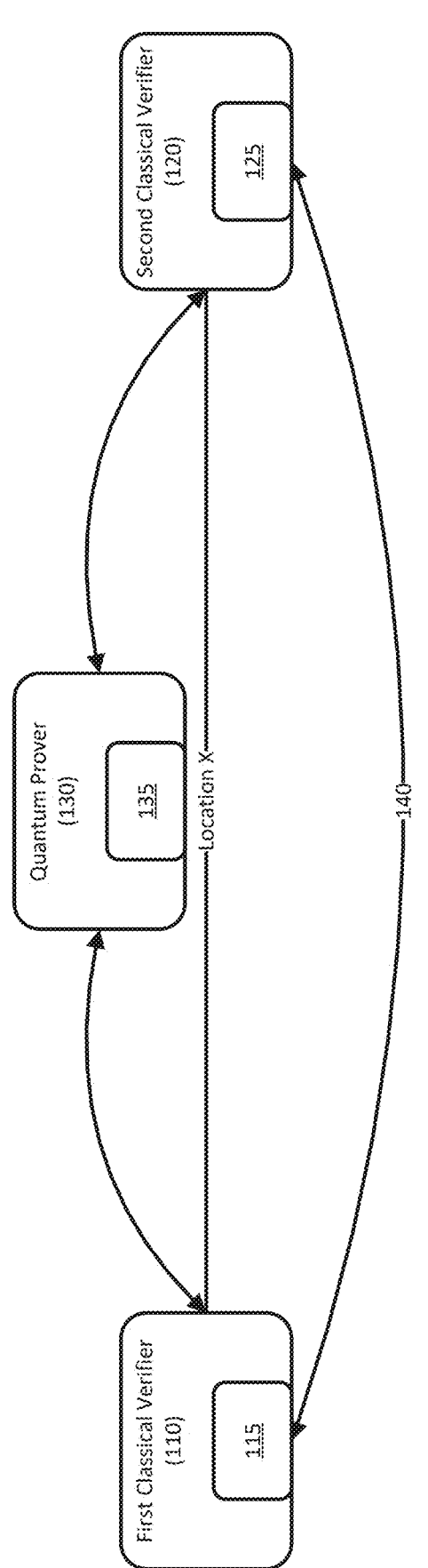
FIG. 1 illustrates a system for practical near-term position verification from certified randomness according to an embodiment.
Figure 1:
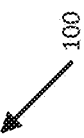

Referring to FIG. 1, a system for practical near-term position verification from certified randomness is disclosed according to an embodiment. System 100 may include first classical verifier 110 and second classical verifier 120. In one embodiment, classical verifiers 110 and 120 may be electronic devices, such as servers, computers, etc. Classical verifiers 110 and 120 may be at known geographical locations, such as data centers or satellites.

First classical verifier 110 may execute first classical verifier computer program 115, and second classical verifier 120 may execute second classical verifier computer program 125.

First classical verifier 110 and second classical verifier 120 may communicate via secure private communication channel 140. For example, secure private communication channel 140 may include a fiber channel, a satellite link, a virtual private network (VPN), etc.

Quantum prover 130 may be a classical electronic device, such as a server, a computer, etc., that has access to a quantum computer capable of executing the certified randomness protocol. Quantum prover 130 may seek to prove its location (i.e., location X) to first classical verifier 110 and second classical verifier 120. Quantum prover 130 may be substantially colinearly located with first classical verifier 110 and second classical verifier 120.

In some embodiments, the quantum prover 130 may be substantially closer to one classical verifier 110 or 120 or than the other, in which case the further classical verifier may inform the closer classical verifier of their expected round trip time to the quantum prover, and the closer classical verifier can delay sending their message to ensure that both messages arrive at the quantum prover at the same time.

Quantum prover may execute prover computer program 135.

First classical verifier 110 and second classical verifier 120 may communicate using any suitable communication channel, preferably with low latency. Examples may include fiber, RF communications, etc.

Figure 2B:
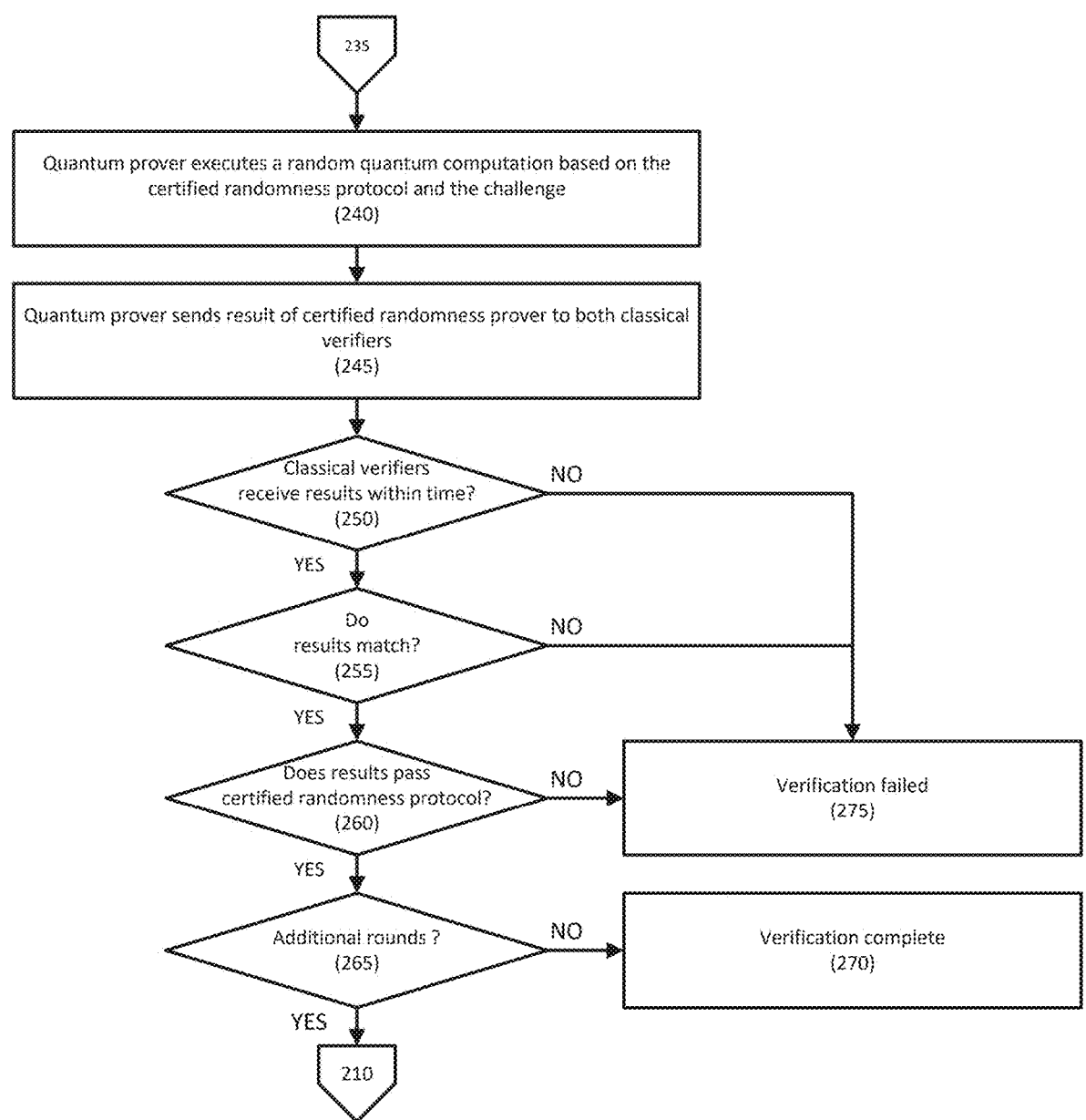

Referring to FIGS. 2A and 2B, a method for practical near-term position verification from certified randomness is disclosed according to an embodiment.

In step 200, a first classical verifier and the second classical verifier may share a long secret string. The long secret string may include a secret string r that may be used by parts of a certified randomness protocol, a first random input x, a second random input y, and a random hash key k that identifies a keyed cryptographic hash function in a given family of keyed cryptographic hash functions. The long secret string may be generated by either of the classical verifiers and may be securely communicated to the other.

The protocol may be run in a single round (i.e., a single challenge) or multiple rounds (i.e., multiple challenges). For multiple rounds, the long secret string may include multiple rounds worth of secret strings r, and/or first random inputs x, and second random inputs y, or the long secret string may be re-generated for each round.

In one embodiment, the length of the long secret string may be based on the sum of the lengths of its components, including the total amount of randomness needed by the classical verifiers in the certified randomness protocol throughout the interaction (e.g., an input parameter that depends on the particular certified randomness protocol being used), the length of the first random input x, the length of the second random input y, and the key length of the hash function (if included).

Examples of keyed cryptographic hash functions include an unkeyed hash function, such as SHA-512, that uses the key k as a salt. Thus, in order to evaluate a hash function identified by k on input x, embodiments may calculate HASH(k||x), where || denotes string concatenation, and hash-based message authentication code (HMAC), etc.

In one embodiment, the first classical verifier and the second classical verifier may agree to a certified randomness protocol. A certified randomness protocol is an interactive protocol between two parties—the classical verifier and the (allegedly) quantum prover. During the interactive protocol, the two parties will exchange classical messages (e.g., messages exchanged by classical computers, such as computers that use bits to process information), in order, for a certain number of rounds, and the classical verifier will generate random challenges that may depend on the quantum prover's previous answers. At the end, the classical verifier(s) will either accept or reject the quantum prover based on the entire transcript of the interaction. The classical verifier thus generates challenges and verifies the certified randomness, while the quantum prover proves the certified randomness.

The certified randomness protocol may include processes for generating challenges, proving certified randomness, and verifying certified randomness. These may be, for example, scripts (e.g., classical scripts and quantum scripts). The processes may depend on the certified randomness protocol selected.

Examples of certified randomness protocols are described in Scott Aaronson and Shih-Han Hung, "Certified Randomness From Quantum Supremacy," Proceedings of the 55th Annual ACM Symposium on Theory of Computing, pp. 933-944 (2023); Zvika Brakerski, et al., "A Cryptographic Test Of Quantumness And Certifiable Randomness From A Single Quantum Device," Journal of the ACM 68.5, pp. 1-47 (2021); and Takashi Yamakawa and Mark Zhandry, "Verifiable Quantum Advantage Without Structure," 2022 IEEE 63rd Annual Symposium on Foundations of Computer Science (FOCS), pp. 69-74 (2022). The disclosure of each of these documents is hereby incorporated, by reference, in its entirety.

In one embodiment, the first classical verifier and the second classical verifier may agree to the certified randomness protocol beforehand, and the agreed-upon certified randomness protocol may be made published to at least the quantum prover so that the quantum prover knows which certified randomness protocol is being used. The same certified randomness protocol may be used throughout the process.

The selection of the certified randomness protocol may be based on, for example, efficiency, robustness, and/or security.

The secret string r that may be a string of randomly generated bits that is known only to the classical verifiers.

In step 205, the secret string r may be used by the classical verifiers to generate a challenge ch according to the certified randomness protocol. The challenge may take the form of a description of a quantum circuit to run, as prescribed by the certified randomness protocol. This may include, for example, gates or any information that may be needed to deterministically generate any desired gates.

In one embodiment, randomness from the secret string r may be used as a seed to deterministically generate the challenge. For example, some or all bits of the secret string r may be used as a seed to the challenge generation process of the certified randomness protocol. The same bits may not be reused as a seed in any additional rounds.

In one embodiment, the bits may be randomly selected.

In step 210, the first classical verifier and the second classical verifier may generate a keyed cryptographic hash function, $G_k$, from a pre-agreed upon family of keyed cryptographic hash functions using the hash key k. For example, the unkeyed cryptographic hash function is publicly known, and once the first classical verifier and the second classical verifier agree to the hash key k, the classical verifiers may generate the keyed cryptographic hash function, $G_k$.

In step 215, each classical verifier may encrypt the challenge, ch, using the output of the keyed cryptographic hash function on a combination of the first random input x and the second random input y. For example, the classical verifiers may set $s=G_k(x+y)+ch$ where s is the encrypted challenge and + is binary addition, or the Exclusively OR (XOR) operation.

In step 220, the first classical verifier may send its encrypted challenge, s, the first input to the hash function, x, and the hash key k to the quantum prover. The first classical verifier may start a timer upon sending.

In step 225, the second classical verifier may send the second input, y, to the quantum prover. The second classical verifier may start a timer upon sending.

In step 230, the quantum prover may receive the encrypted challenge, s, the first random input, x, and the second random input, y, substantially simultaneously.

In step 235, the quantum prover may compute the challenge by using the hash key, k, the first random input, x, and the second random input, y, to decrypt the challenge, ch, from the encrypted challenge, s, using the keyed cryptographic hash function identified by the hash key k.

In step 240, quantum prover may execute a random quantum computation that is specified by the certified randomness protocol and the challenge ch, resulting in a result m. For example, the random quantum computation may be execution of the quantum circuit described by challenge ch.

In step 245, the quantum prover may send the result, m, to both classical verifiers. Each classical verifier may stop its time upon receipt of the result.

In step 250, the classical verifiers may determine if both verifiers received the response within a time period. Based on the location of the quantum prover relative to each classical verifier, the classical verifiers may confirm that the round-trip time is within a threshold. The threshold may be based on the distance between the classical verifier and the quantum prover divided by the speed of light with some tolerance (if desired).

The classical verifiers may communicate the result of timing result to each other or may defer until a later time.

If each classical verifier received the response within the threshold, in step 255, the classical verifiers may compare the results received with each to ensure that they match. For example, the classical verifiers may send the result that each received to each other. In another embodiment, the classical verifiers may hash the results received from the quantum prover and may compare the hashes.

For example, one classical verifier may send the hash and the other classical verifier, which can check if it matches with its hash, then send a response, such as a YES/NO message.

The classical verifiers may defer the comparison until a later time if desired.

In step 260, each of the classical verifiers may determine whether the result received from the quantum prover passes the certified randomness protocol (i.e., the result m has been certified to be sufficiently random) using the verification process of the certified randomness protocol. The verification process may be a classical verification process that is described by the certified randomness protocol and may vary depending on the certified randomness protocol being used. For example, the verification process may involve calculating a statistical score of the result using the description of the quantum circuit, and checking whether this score lies above a certain threshold. The threshold may be based on the certified randomness protocol that is selected. Classical prover algorithms cannot exceed this threshold, whereas a quantum prover algorithm can by simply running the prescribed random circuit and measuring its output.

For example, the threshold may be the cross-entropy benchmarking (XEB) fidelity of the samples. The XEB fidelity is the average of the probability (which can be computed using simulation of quantum computers) of all samples. Quantum computers have high XEB fidelity if it is high quality quantum computer, and classical computers generally have low XEB fidelity unless it is an unreasonably powerful supercomputer. Determination of the threshold depends on the protocol security requirements, assumptions on the adversary's power, and the quality of the quantum computer.

Each classical verifier may use the randomness r, the result m, and the challenge ch in this process, and may either accept or reject the result m. If multiple rounds are needed, they may defer verification until all rounds have been collected; alternatively, the classical verifiers may do this after every round.

The classical verifiers may defer the communication of the result until a later time if desired.

In step 265, if additional rounds are needed, the process may return to step 210. For example, the number of rounds may depend on the certified randomness protocol being used, which is chosen before the start of the protocol.

In some embodiments, the classical verifiers may send each of their challenges to the quantum prover in rapid succession, without waiting for the quantum prover to respond to each challenge, and they may conduct verification after receiving each message or after receiving all messages.

If any of the comparisons in steps 250, 255, or 260 fail, in step 275, the verification will have failed, and the classical verifiers reject the prover's claim. For example, as a result of the rejection, the quantum prover may not be allowed access to a resource, etc.

In step 270, if no additional rounds are needed and verification has passed, the classical verifiers have successfully confirmed the quantum prover's position. In one embodiment, the prover may be granted access to a resource, such as a computing resource, a communication resource, etc.

Figure 3:
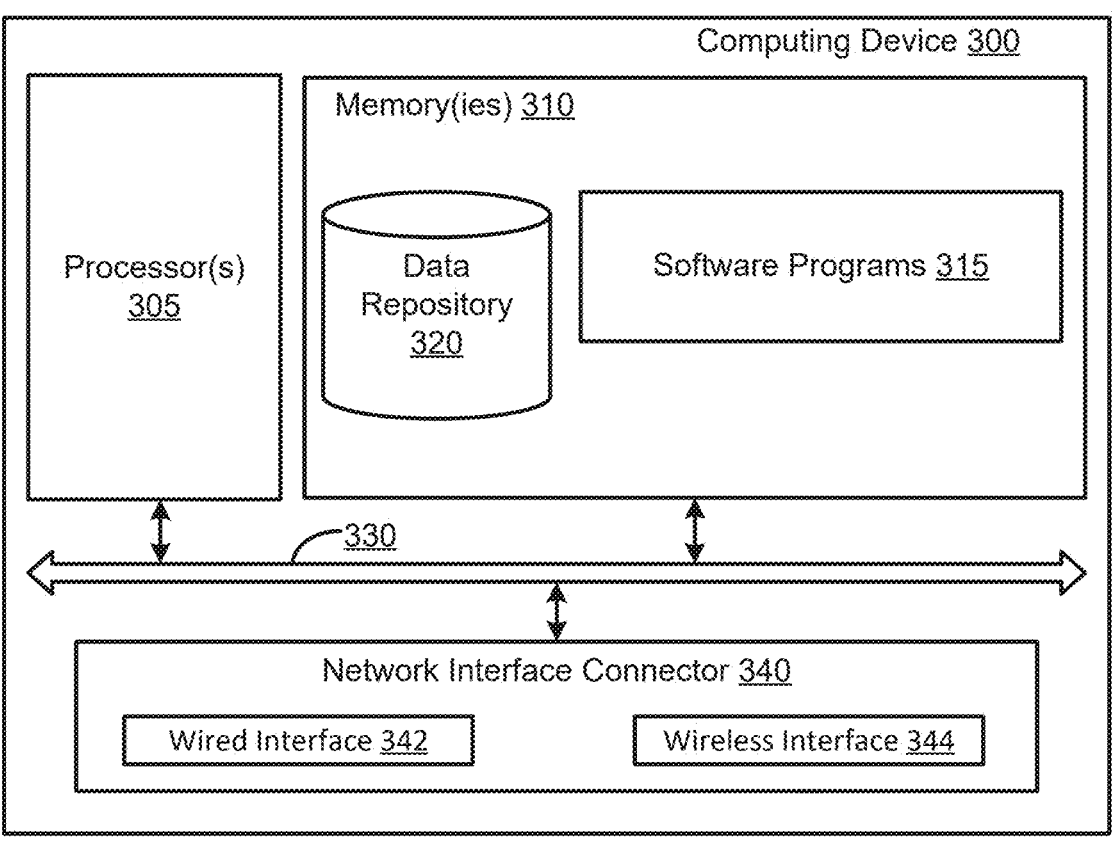
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

sharing, by a first classical verifier and a second classical verifier, a long secret string comprising a secret string, a first random input, a second random input, and a random hash key that identifies one of a plurality of keyed cryptographic hash functions;

generating, by the first classical verifier and the second classical verifier, a challenge according to a certified randomness protocol using the secret string;

sampling, by the first classical verifier and the second classical verifier, a keyed cryptographic hash function from the plurality of keyed cryptographic hash functions using the random hash key;

encrypting, by each of the first classical verifier and the second classical verifier, the challenge using an output of the keyed cryptographic hash function on a combination of the first random input and the second random input;

sending, by the first classical verifier, the encrypted challenge, the first random input, and the random hash key to a quantum prover;

sending, by the second classical verifier, the second random input to the quantum prover;

receiving, by the quantum prover, the encrypted challenge, the first random input and the second random input;

decrypting, by the quantum prover, the encrypted challenge using the random hash key, the first random input, and the second random input;

executing, by the quantum prover, a random quantum computation based on the certified randomness protocol and the challenge;

sending, by the quantum prover, a result of the random quantum computation to both the first classical verifier and the second classical verifier;

determining, by the first classical verifier and the second classical verifier, that the result of the random quantum computation was received within a time threshold;

comparing, by the first classical verifier and the second classical verifier, the result received by the first classical verifier and the result received by the second classical verifier to ensure that they match; and determining, by the first classical verifier and the second classical verifier that the result passes the certified randomness protocol using the secret string.

2. The method of claim 1, wherein the challenge is generated using a randomness in the secret string, wherein the randomness comprises bits selected from the secret string.

3. The method of claim 1, wherein the challenge comprises a description of a quantum circuit.

4. The method of claim 1, wherein the keyed cryptographic hash function comprises a salted hash function or a hash-based message authentication code (HMAC).

5. The method of claim 1, wherein the time threshold is based on a physical distance between at least one of the first classical verifier and the second classical verifier, and the quantum prover.

6. The method of claim 1, wherein the certified randomness protocol comprises a process for generating the challenge, a process for proving certified randomness using the challenge to generate the result, and a process for verifying that the result passes the certified randomness protocol.

7. The method of claim 1, further comprising:

generating, by the first classical verifier and the second classical verifier, a second challenge according to the certified randomness protocol using the secret string;

encrypting, by each of the first classical verifier and the second classical verifier, the second challenge using the output of the keyed cryptographic hash function on a combination of the first random input and the second random input;

sending, by the first classical verifier, the second encrypted challenge to the quantum prover, wherein the second encrypted challenge is sent before the result is received;

sending, by the second classical verifier, the second random input to the quantum prover;

receiving, by the quantum prover, the second encrypted challenge and the second random input;

computing, by the quantum prover, the second challenge using the random hash key, the first random input, and the second random input to decrypt the encrypted challenge;

running, by the quantum prover, a certified randomness prover on the second challenge to obtain a second result;

sending, by the quantum prover, the second result to both the first classical verifier and the second classical verifier;

determining, by the first classical verifier and the second classical verifier, that the second result was received within the time threshold;

comparing, by the first classical verifier and the second classical verifier, the second result received by the first classical verifier and the second result received by the second classical verifier to ensure that they match; and determining, by the first classical verifier and the second classical verifier that the second result passes the certified randomness protocol.

8. The method of claim 1, wherein the first classical verifier and the second classical verifier comprises classical electronic devices, and the quantum prover comprises a classical electronic device with access to a quantum computer.

9. The method of claim 1, further comprising:

agreeing, by the first classical verifier and the second classical verifier, to a selection of the certified randomness protocol; and publishing, by the first classical verifier or the second classical verifier, the selected certified randomness protocol to the quantum prover.

10. The method of claim 1, wherein the secret string comprises random bits and is known to only the first classical verifier and the second classical verifier.

11. A system, comprising:

a first classical verifier electronic device;

a second classical verifier electronic device; and a quantum prover electronic device that is communication with a quantum computer;

wherein:

the first classical verifier electronic device and the second classical verifier electronic device are configured to share a long secret string comprising a secret string, a first random input, a second random input, and a random hash key that identifies one of a plurality of keyed cryptographic hash functions;

the first classical verifier electronic device and the second classical verifier electronic device are configured to generate a challenge according to a certified randomness protocol using the secret string;

the first classical verifier electronic device and the second classical verifier electronic device are configured to sample a keyed cryptographic hash function from the plurality of keyed cryptographic hash functions using the random hash key;

the first classical verifier electronic device and the second classical verifier electronic device are each configured to encrypt the challenge using an output of the keyed cryptographic hash function on a combination of the first random input and the second random input;

the first classical verifier electronic device is configured to send the encrypted challenge, the first random input, and the random hash key to the quantum prover electronic device;

the second classical verifier electronic device is configured to send the second random input to the quantum prover electronic device;

the quantum prover electronic device is configured to receive the encrypted challenge, the first random input and the second random input;

the quantum prover electronic device is configured to decrypt the encrypted challenge using the random hash key, the first random input, and the second random input;

the quantum prover electronic device is configured to execute a random quantum computation based on the certified randomness protocol and the challenge using the quantum computer;

the quantum prover electronic device is configured do send, a result of the random quantum computation to both the first classical verifier electronic device and the second classical verifier electronic device;

the first classical verifier electronic device and the second classical verifier electronic device are configured to determine that the result of the random quantum computation was received within a time threshold;

the first classical verifier electronic device and the second classical verifier electronic device are configured to compare the result received by the first classical verifier electronic device and the result received by the second classical verifier electronic device to ensure that they match; and the first classical verifier electronic device and the second classical verifier electronic device determine that the result passes the certified randomness protocol using the secret string.

12. The system of claim 11, wherein the challenge is generated using a randomness in the secret string, wherein the randomness comprises bits selected from the secret string.

13. The system of claim 11, wherein the challenge comprises a description of a quantum circuit.

14. The system of claim 11, wherein the keyed cryptographic hash function comprises a salted hash function or a hash-based message authentication code (HMAC).

15. The system of claim 11, wherein the time threshold is based on a physical distance between at least one of the first classical verifier electronic device and the second classical verifier electronic device, and the quantum prover electronic device.

16. The system of claim 11, wherein the certified randomness protocol comprises a process for generating the challenge, a process for proving certified randomness using the challenge to generate the result, and a process for verifying that the result passes the certified randomness protocol.

17. The system of claim 11, wherein:

the first classical verifier electronic device and the second classical verifier electronic device are configured to generate a second challenge according to the certified randomness protocol using the secret string;

the first classical verifier electronic device and the second classical verifier electronic device are configured to encrypt the second challenge using the output of the keyed cryptographic hash function on a combination of the first random input and the second random input;

the first classical verifier electronic device is configured to the second encrypted challenge to the quantum prover electronic device, wherein the second encrypted challenge is sent before the result is received;

the second classical verifier electronic device is configured to the second random input to the quantum prover electronic device;

the quantum prover electronic device computer program receives is configured to receive the second encrypted challenge and the second random input;

the quantum prover electronic device computes is configured to compute the second challenge using the random hash key, the first random input, and the second random input to decrypt the encrypted challenge;

the quantum prover electronic device is configured to run the certified randomness prover on the second challenge to obtain a second result;

the quantum prover electronic device is configured to send the second result to both the first classical verifier electronic device and the second classical verifier electronic device;

the first classical verifier electronic device and the second classical verifier electronic device are configured to determine that the second result was received within the time threshold;

the first classical verifier electronic device and the second classical verifier electronic device are configured to compare the second result received by the first classical verifier electronic device and the second result received by the second classical verifier electronic device to ensure that they match; and the first classical verifier electronic device and the second classical verifier electronic device are configured to determine that the second result passes the certified randomness protocol.

18. The system of claim 11, wherein the first classical verifier electronic device and the second classical verifier electronic device comprises classical electronic devices, and the quantum prover electronic device comprises a classical electronic device with access to a quantum computer.

19. The system of claim 11, wherein:

the first classical verifier electronic device and the second classical verifier electronic device are configured to agree to a selection of the certified randomness protocol; and the first classical verifier electronic device or the second classical verifier electronic device is configured to publish the selected certified randomness protocol to the quantum prover.

20. The system of claim 11, wherein the secret string comprises random bits and is known to only the first classical verifier electronic device and the second classical verifier electronic device.

* * * * *